July 7, 1931.  M. C. SNYER  1,813,468
AIRCRAFT
Filed May 12, 1930   4 Sheets-Sheet 3

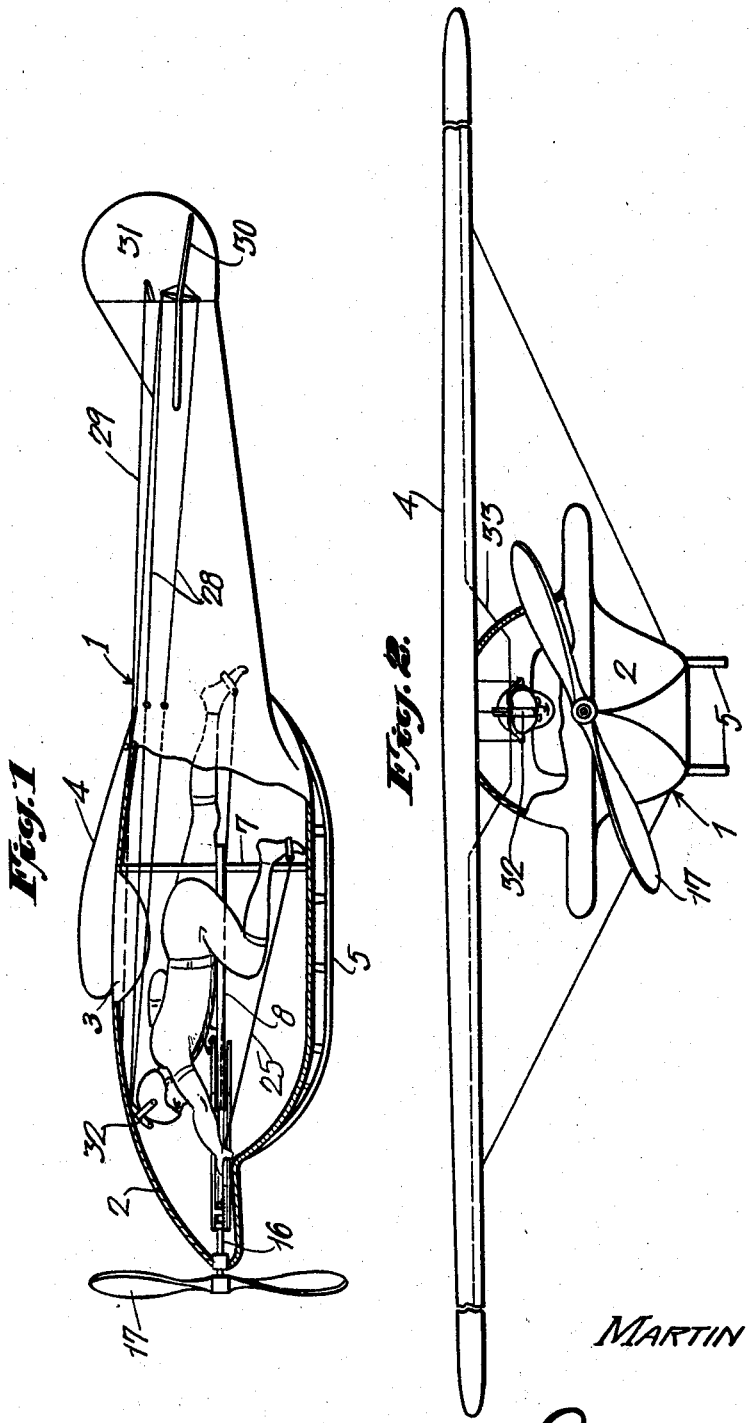

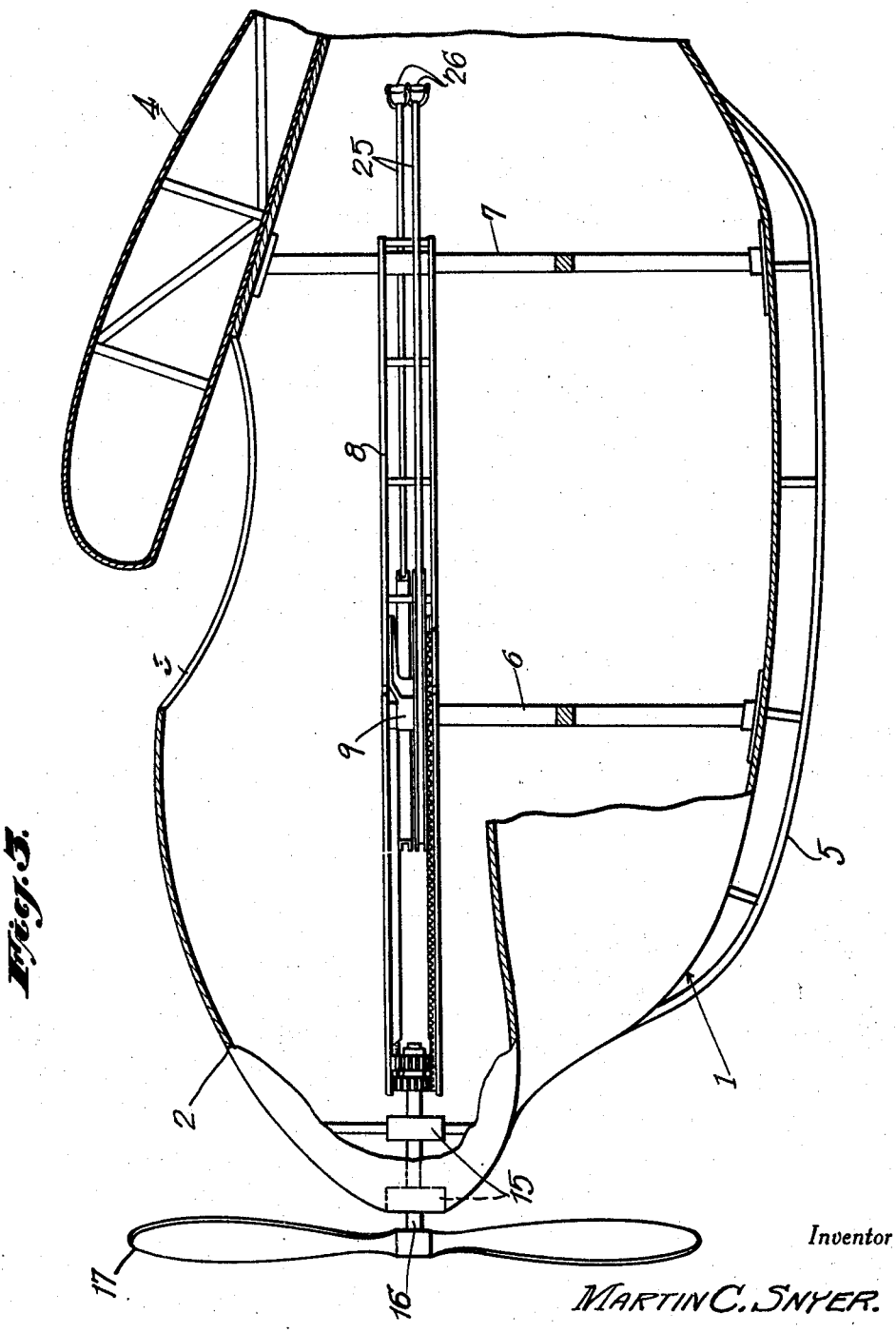

Inventor
MARTIN C. SNYER.
By Clarence A. O'Brien
Attorney

July 7, 1931.　　　　　M. C. SNYER　　　　　1,813,468
AIRCRAFT
Filed May 12, 1930　　　4 Sheets-Sheet 4
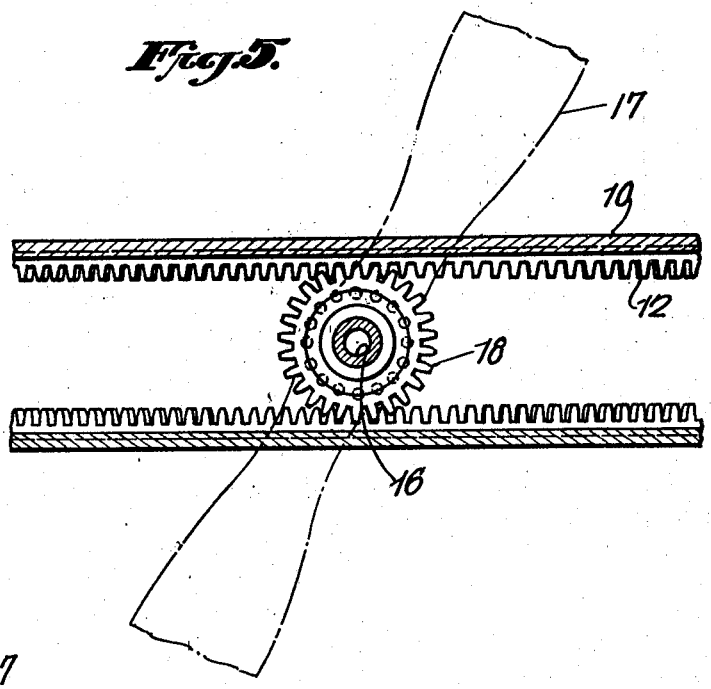
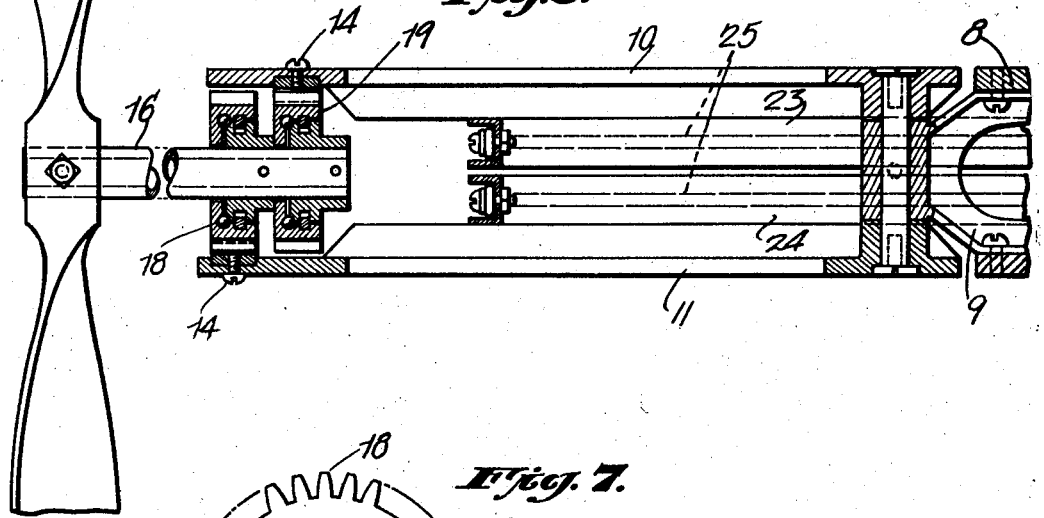
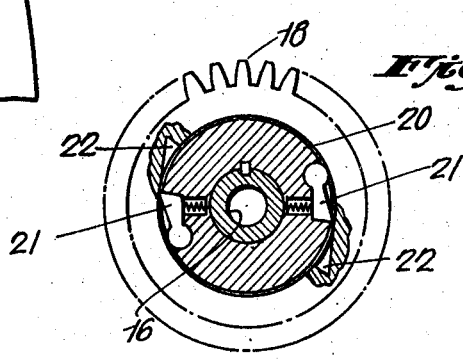
Inventor
MARTIN C. SNYER.
By Clarence A. O'Brien
Attorney Patented July 7, 1931

1,813,468

UNITED STATES PATENT OFFICE

MARTIN C. SNYER, OF PATERSON, NEW JERSEY

AIRCRAFT

Application filed May 12, 1930. Serial No. 451,671.

This invention relates to improvements in aircrafts and more particularly to devices of this character of the glider type.

An important object of the invention is to provide, in a manner as hereinafter set forth, an aircraft of the aforementioned character which embodies manually operated propulsion means for use when it is so desired in flight or in taking off or landing.

Another important object of the invention is to provide, in a manner as hereinafter set forth, an aircraft of the character described embodying control means operable by shifting the head of the pilot or operator in a predetermined manner.

Other objects of the invention are to provide an aircraft which will be simple in construction, strong, durable, efficient in its use and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:—

Figure 1 is a view partly in vertical longitudinal section and partly in side elevation of an aircraft constructed in accordance with this invention showing an operator in position therein.

Figure 2 is a view in front elevation thereof partly broken away in cross section.

Figure 3 is a fragmentary view showing the forward portion of the aircraft in longitudinal vertical section.

Figure 5 is a sectional view showing the rack and gear mechanism for driving the propeller.

Figure 6 is a detail view in longitudinal section illustrating the driving mechanism for the propeller.

Figure 7 is a detail view in cross section illustrating one of the clutch devices by means of which the rack bars are operatively connected to the propeller shaft.

Figure 4:
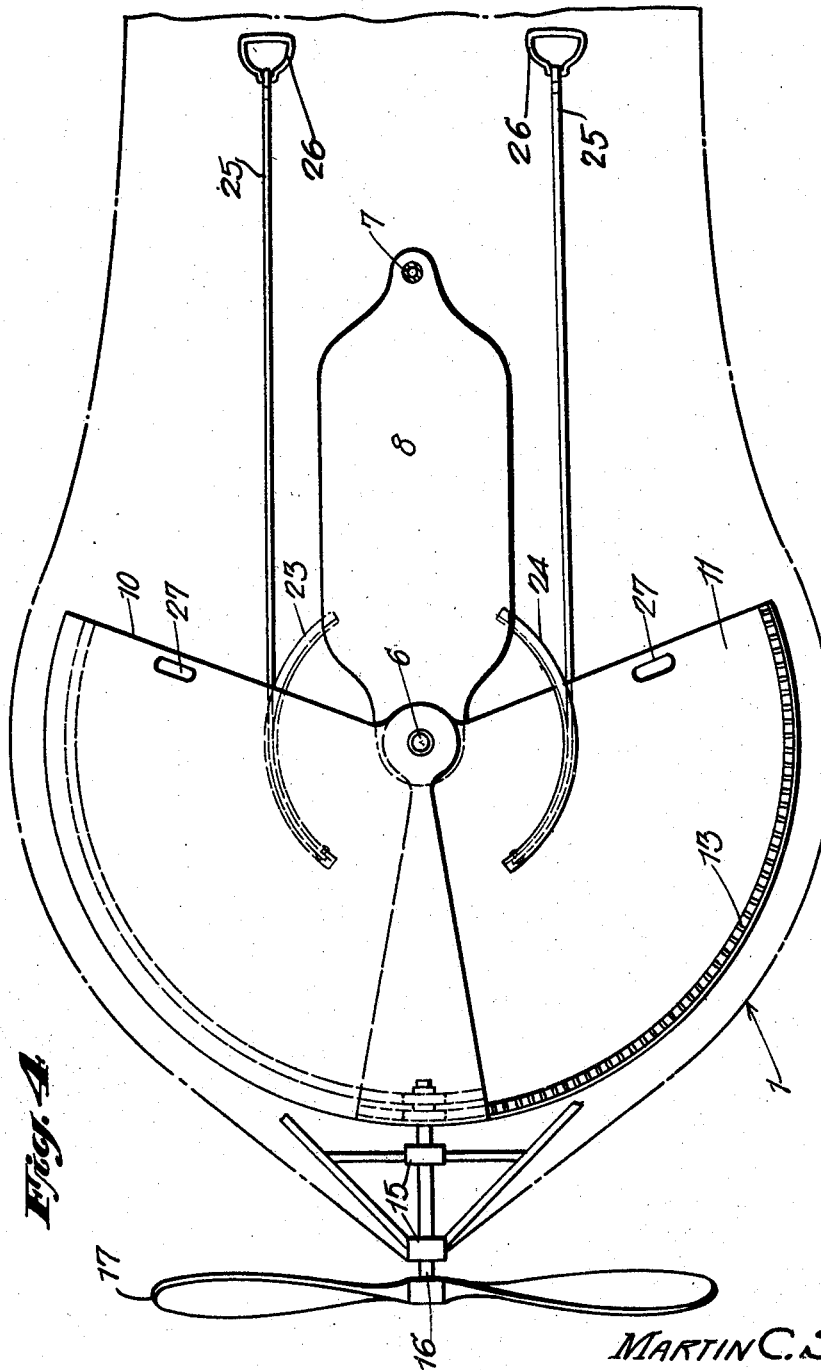
Figure 4 is a view in top plan showing the manually driven propelling mechanism.

Referring to the drawings in detail, the reference character 1 designates generally the aircraft comprising a fuselage 2 provided with an opening 3 in its top for entrance thereinto and the transversely extending wing 4. On its bottom, the fuselage 2 is provided with the landing skids 5 which conform substantially to the longitudinal configuration of the adjacent bottom portion of said fuselage.

A vertical post or standard 6 is rigidly mounted in the fuselage adjacent the forward end thereof and terminates in spaced relation to the top thereof as clearly seen in Figure 3 of the drawings. Another vertical standard 7 is rigidly mounted between the upper and lower walls of the fuselage in rearwardly spaced relation to the standard 6. A platform 8 is supported between the standards 6 and 7 for supporting the up body of an operator as clearly indicated in Figure 1 of the drawings. The forward end of the platform 8 is supported on the standard 6 through the medium of a bracket 9.

Rotatably mounted for swinging movement in a horizontal plane on the upper end portion of the standard 6 is a pair of segmental plates 10 and 11, the plate 10 being disposed above the horizontal plane of the plate 11. On their opposite sides the arcuate marginal portions of the plates 10 and 11 have rigidly mounted thereon the longitudinally curved rack bars 12 and 13, respectively, which are secured thereto, as at 14. Mounted in suitable bearing devices 15 in the forward end portion of the fuselage is the rotatable propeller shaft 16 which extends forwardly and has fixed thereon the propeller 17. The rear end portion of the shaft 16 is disposed between the rack bars 12 and 13 of the plates 10 and 11 and has mounted thereon a gear 18 which meshes with the lower rack 13, and a gear 19 which meshes with the upper rack bar 12. The gears 18 and 19 are mounted on hub devices 20 (see Figure 7) in diametrically opposite sides of the periphery of which are the spring controlled dogs 21 adapted to seat in the recesses 22 provided in the inner periphery of each gear in a manner to cause the rotation of said hub portion and the propeller shaft to which said hub portions are keyed when the gears are rotated in one direction only. This arrangement constitutes a clutch in each of the gears and said clutches are oppositely disposed in order that one gear will drive the propeller shaft while the other gear is idling.

Arcuate channelled bars 23 and 24 are secured to the opposed sides of the segmental plates 10 and 11, respectively, and extend rearwardly therefrom as illustrated to advantage in Figure 4 of the drawings. Foot operated pull cables 25 have their forward ends anchored to the forward end portions of the channel bars 23 and 24 and have stirrups 26 secured to their free ends for the reception of the foot of the operator or pilot. Adjacent their rear edges, each of the segmental plates 10 and 11 is provided a hand hold opening 27 for a purpose which will be presently set forth.

Cables or wires 28 and 29 extend from the elevator 30 and the rudder 31, respectively, to an anchoring device 32 mounted on the head of the operator or pilot. Cables or wires 33 are also connected to said head device 32 and extends in opposite direction through the wing 4 of the aircraft and are operatively connected to the ailerons (not shown). In use, the operator or pilot assumes the position illustrated in Figure 1 of the drawings on the platform 8 and inserts his feet through the stirrups 26 of the pull cable 25 and grasps the segmental plates 10 and 11 through the medium of the hand hold openings 27 therein. He then alternately swings the plates rearwardly and then forwardly and with each rearward movement of said plates the clutch devices 21 couple the gears 18 and 19 which are constantly in mesh with the rack bars 12 and 13 to the propeller shaft 16 and said shaft and the propeller 17 thereon are thus driven continuously in one direction, as will be apparent. It will be seen that great force may be exerted on the plates 10 and 11 when pulling the same rearwardly or on the power stroke, by reason of the fact that the operator is enabled to use the strength of both his arms and his legs in this operation. By shifting his head in a predetermined manner, the operator is enabled to manipulate the control wires 28, 29 and 33 in a manner to control the aircraft as desired.

It is believed that the many advantages of an aircraft constructed in accordance with this invention will be readily understood, and although the preferred embodiment of the invention is as illustrated and described, it is to be understood that changes in the details of construction may be had which will fall within the scope of the invention as claimed.

What is claimed is:—

1. An aircraft of the character described including a fuselage, a horizontally disposed platform mounted in the fuselage adapted to support an operator, a pair of segmental plates mounted for oscillatory swinging movement in a horizontal plane forwardly of the platform in vertically spaced relation to each other, rack bars on the forward marginal portion of the segmental plates and on the opposite sides thereof, a propeller operatively connected to the rack bars in a manner to be driven continuously in one direction when the segmental plates are oscillated and means for oscillating said plates manually.

2. An aircraft of the character described including a fuselage, a horizontally disposed platform mounted in the fuselage adapted to support an operator, a pair of segmental plates mounted for oscillatory swinging movement in a horizontal plane forwardly of the platform in vertically spaced relation to each other, rack bars on the forward marginal portions of the segmental plates and on the opposed sides thereof, a shaft rotatably mounted on the fuselage having one end extending forwardly therefrom and another end extending between the plates, gears mounted on the last mentioned end portion of the shaft for rotation thereon, said gears being constantly in mesh with the rack bars for actuation thereby, one way clutch devices mounted on the shaft and engageable with the gears for coupling the same to the shaft, a propeller fixed on the opposite end of the shaft and means for oscillating the plates manually.

3. An aircraft of the character described including a fuselage, a horizontally disposed platform mounted in the fuselage adapted to support an operator, a pair of flat segmental plates mounted for oscillatory swinging movement in a horizontal plane forwardly of the platform in vertically spaced relation to each other and having hand hold openings provided therein to be gripped by the operator for actuating the plates, arcuate longitudinally extending channel bars rigidly mounted on the inner sides of the plates, a pull cable anchored to the forward end portion of each of the channel bars, means on the rear end portion of the pull cable for the reception of the foot of the operator, longitudinally curved rack bars rigidly mounted on the curved marginal portion of the segmental plates on the inner sides thereof and a propeller shaft operatively connected to each of the rack bars for rotation thereby in one direction when said rack bars are oscillated.

4. An aircraft of the character described comprising a fuselage, a horizontally disposed platform mounted in the fuselage adapted to support an operator, manually operable means for propelling the aircraft, said aircraft including an elevator, a rudder and ailerons, control wires operatively connected to said elevator, rudder and ailerons at one end and an anchoring device adapted to fit on the head of the operator and connected to the opposite end of the control cables and adapted to actuate the same when the operator shifts his head in a predetermined manner.

5. An aircraft of the character described including a fuselage, a horizontally disposed platform mounted in the fuselage and adapted to support an operator, a segmental member mounted for oscillatory swinging movement in a horizontal plane forwardly of said platform, a propeller, means operatively connected to said segmental member in a manner to be driven continuously in one direction when the said member is oscillated, and means for manually oscillating said member.

In testimony whereof I affix my signature.

MARTIN C. SNYER.